US009377653B2

(12) United States Patent
Yao et al.

(10) Patent No.: US 9,377,653 B2
(45) Date of Patent: Jun. 28, 2016

(54) PVA PIXEL ELECTRODE AND LIQUID CRYSTAL DISPLAY APPARATUS USING THE SAME

(75) Inventors: Xiaohui Yao, Shenzhen (CN); Jehao Hsu, Shenzhen (CN); Jingfeng Xue, Shenzhen (CN)

(73) Assignee: Shenzhen China Star Optoelectronics Technology Co. Ltd., Shenzhen (CN)

( * ) Notice: Subject to any disclaimer, the term of this patent is extended or adjusted under 35 U.S.C. 154(b) by 89 days.

(21) Appl. No.: 13/379,940

(22) PCT Filed: Aug. 25, 2011

(86) PCT No.: PCT/CN2011/078953
§ 371 (c)(1),
(2), (4) Date: Dec. 21, 2011

(87) PCT Pub. No.: WO2013/016885
PCT Pub. Date: Feb. 7, 2013

(65) Prior Publication Data
US 2013/0033668 A1    Feb. 7, 2013

(30) Foreign Application Priority Data
Aug. 3, 2011  (CN) .......................... 2011 1 0221337

(51) Int. Cl.
*G02F 1/1343*    (2006.01)
*G02F 1/1337*    (2006.01)
*G02F 1/1362*    (2006.01)
*G02F 1/139*    (2006.01)

(52) U.S. Cl.
CPC .......... *G02F 1/133707* (2013.01); *G02F 1/139* (2013.01); *G02F 1/1362* (2013.01)

(58) Field of Classification Search
None
See application file for complete search history.

(56) References Cited

U.S. PATENT DOCUMENTS

| 7,903,217 | B2* | 3/2011 | Hsu et al. .................. 349/143 |
| 2003/0071952 | A1* | 4/2003 | Yoshida et al. ............. 349/141 |
| 2007/0019144 | A1 | 1/2007 | Nakanishi et al. |
| 2007/0046877 | A1* | 3/2007 | Lin et al. .................. 349/129 |
| 2007/0247559 | A1 | 10/2007 | Tasaka et al. |

(Continued)

FOREIGN PATENT DOCUMENTS

| CN | 101089682 A | 12/2007 |
| CN | 101201513 A | 6/2008 |
| CN | 101968582 A | 2/2011 |

OTHER PUBLICATIONS

Machine translation of CN 101968582 A, Feb. 2011, China.*

*Primary Examiner* — Ryan Crockett
(74) *Attorney, Agent, or Firm* — Mark M. Friedman

(57) ABSTRACT

The present invention provides a patterned vertical alignment (PVA) pixel electrode comprising: a first electrode in the form of a ")" or "《" shape disposed on a TFT array substrate; and a second electrode in the form of a "〉" or "《" shape corresponding to the first electrode and disposed on a CF substrate, wherein the first electrode and/or the second electrode includes ITO slits with unequal length which are disposed between the fringes of the first electrode and the second electrode for improving a display quality of the pixel. The present invention further provides a liquid crystal display (LCD) apparatus. The PVA pixel electrode and the LCD apparatus using the same can raise a transmittance and a display quality of the pixel.

5 Claims, 5 Drawing Sheets

(56) References Cited

U.S. PATENT DOCUMENTS

| | | | |
|---|---|---|---|
| 2008/0024706 A1* | 1/2008 | Yang et al. | 349/129 |
| 2009/0310049 A1* | 12/2009 | Hsu et al. | 349/38 |
| 2010/0099204 A1* | 4/2010 | Lai | 438/4 |
| 2010/0157227 A1* | 6/2010 | Lu et al. | 349/141 |
| 2010/0214517 A1 | 8/2010 | Um et al. | |
| 2013/0128208 A1* | 5/2013 | Yao et al. | 349/142 |

* cited by examiner

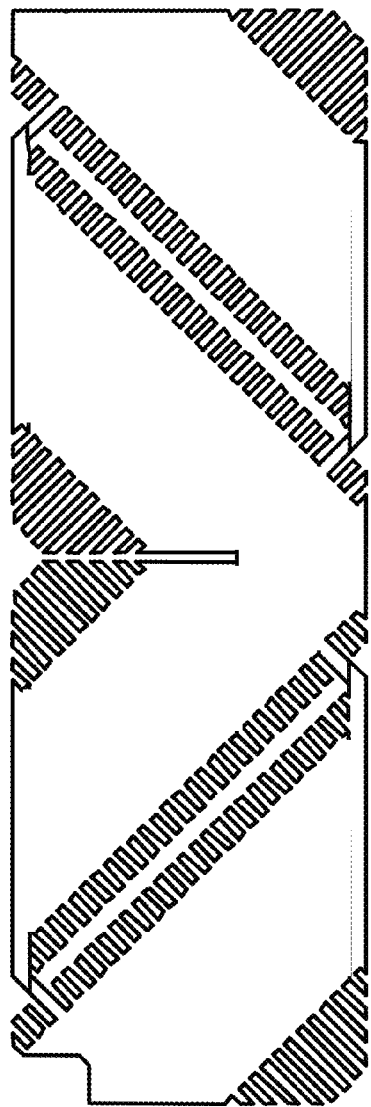
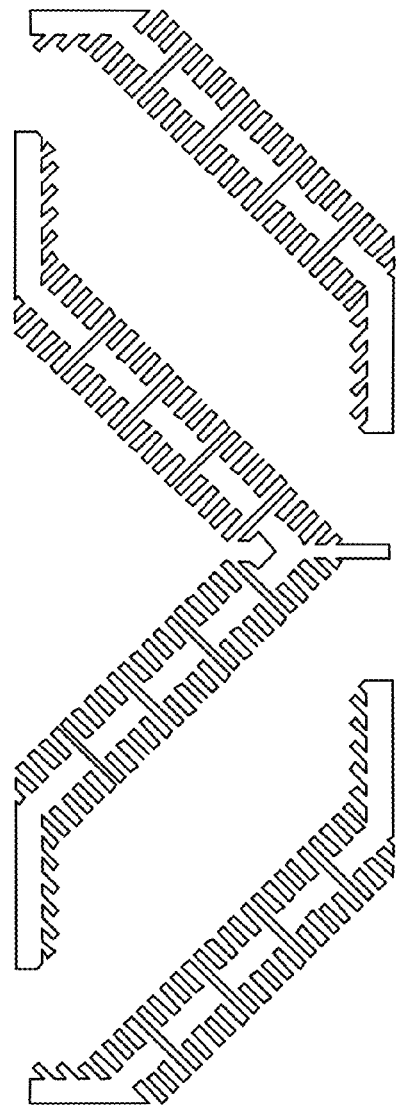
FIG.1A
PRIOR ART
FIG.1B
PRIOR ART

PVA PIXEL ELECTRODE AND LIQUID CRYSTAL DISPLAY APPARATUS USING THE SAME

FIELD OF THE INVENTION

The present invention relates to a field of a liquid crystal display technology, and more particularly to a patterned vertical alignment (PVA) pixel electrode and a liquid crystal display (LCD) apparatus using the same capable of raising transmittance and display quality.

BACKGROUND OF THE INVENTION

Patterned vertical alignment (PVA) is a type of vertical alignment (VA) techniques for LCD. In PVA technique, an electric field between patterned electrodes of a thin film transistor (TFT) array substrate and a color filter (CF) substrate is used to control the alignment of liquid crystal molecules therebetween, thereby omitting a rubbing alignment for a polyimide (PI) layer.

Referring to FIG. 1A and FIG. 1B, a conventional PVA pixel structure is in the form of a "》" or "《" shape. Due to a difference between the fringe and the inner of the PVA pixel electrode, the electric field of the fringe of the PVA pixel electrode is different to the electric field of the inner thereof. Therefore, fringe field effects arise in the liquid crystal molecules, and a disclination line appears at the 》 or 《 -shaped electrode between the TFT array substrate and the CF substrate, deteriorating a display quality and an aperture ratio of the pixel. Referring to FIG. 5A, disclination lines of the liquid crystal molecules arise at the marked positions shown in FIG. 5A, and dark lines appear in the pixel, thereby deteriorating the display quality of the pixel.

As a result, it is necessary to provide a PVA pixel electrode and an LCD apparatus using the same to solve the problems existing in the conventional technologies, as described above.

SUMMARY OF THE INVENTION

The present invention provides a PVA pixel electrode and an LCD apparatus using the same to solve the problem that the display quality and aperture ratio of the pixel are affected by the fringe field effects of the liquid crystal molecules, wherein the transmittance and display quality of the pixel can be improved by modifying ITO slits at the fringes on the TFT array substrate or the CF substrate.

A primary object of the present invention is to provide a PVA pixel electrode comprising: a first electrode with a body in the form of a "》" or "《" shape disposed on a thin film transistor (TFT) array substrate; and a second electrode with a body in the form of a "》" or "《" shape corresponding to the first electrode and disposed on a color filter (CF) substrate, wherein an alignment of liquid crystal molecules between the first electrode and the second electrode is controlled by an electric field between the first electrode and the second electrode, and the first electrode and/or the second electrode includes ITO slits with unequal length extended vertically from the body, the ITO slits with unequal length-are disposed between the fringes of the first electrode and the second electrode for improving a display quality of the pixel; and a length difference between adjacent ITO slits of the first electrode is in the range of 1 um to 10 um, and a length difference between adjacent ITO slits of the second electrode is in the range of 1 um to 15 um. When the body of the first electrode and the body of the second electrode are in the form of the "》" shape, the ITO slits with unequal length of the first electrode and the second electrode are positioned at a top right position, a bottom right position and a middle left position of the electrodes. When the body of the first electrode and the body of the second electrode are in the form of the "《" shape, the ITO slits with unequal length of the first electrode and the second electrode are positioned at a top left position, a bottom left position and a middle right position of the electrodes.

Another object of the present invention is to provide a PVA pixel electrode comprising: a first electrode with a body in the form of a "》" or "《" shape disposed on a TFT array substrate; and a second electrode with a body in the form of a "》" or "《" shape corresponding to the first electrode and disposed on a CF substrate, wherein an alignment of liquid crystal molecules between the first electrode and the second electrode is controlled by an electric field between the first electrode and the second electrode, and the first electrode and/or the second electrode includes ITO slits with unequal length extended vertically from the body, the ITO slits with unequal length are disposed between the fringes of the first electrode and the second electrode for improving a display quality of the pixel.

Still another object of the present invention is to provide a liquid crystal display apparatus, and the liquid crystal display apparatus comprises: a liquid crystal layer; a TFT array substrate configured to control orientations of liquid crystal molecules of the liquid crystal layer; a CF substrate configured to display different colors; and a plurality of PVA pixel electrodes, wherein each of the PVA pixel electrodes comprising: a first electrode with a body in the form of a "》" or "《" shape disposed on a TFT array substrate; and a second electrode with a body in the form of a "》" or "《" shape corresponding to the first electrode and disposed on a CF substrate, wherein an alignment of liquid crystal molecules between the first electrode and the second electrode is controlled by an electric field between the first electrode and the second electrode, and the first electrode and/or the second electrode includes ITO slits with unequal length extended vertically from the body, the ITO slits with unequal length are disposed between the fringes of the first electrode and the second electrode for improving a display quality of the pixel.

In one embodiment of the present invention, a length difference between the adjacent ITO slits of the first electrode is in the range of 1 um to 10 um.

In one embodiment of the present invention, a length difference between the adjacent ITO slits of the second electrode is in the range of 1 um to 15 um.

In one embodiment of the present invention, when the body of the first electrode is in the form of the "》" shape, the ITO slits of the first electrode are positioned at a top right position, a bottom right position and a middle left position of the first electrode. The first electrode further comprises ITO slits with equal length positioned horizontally between the ITO slits with unequal length at the middle left position and the top right position and positioned horizontally between the ITO slits with unequal length at the middle left position and the bottom right position, the body of the first electrode has different widths between each of the ITO slits with unequal length and each of the ITO slits with equal length.

In one embodiment of the present invention, when the body of the first electrode is in the form of the "《" shape, the ITO slits with unequal length of the first electrode are positioned at a top left position, a bottom left position and a middle right position of the first electrode. The first electrode further comprises ITO slits with equal length positioned horizontally between the ITO slits with unequal length at the middle right position and the top left position and positioned horizontally between the ITO slits with unequal length at the middle right position and the bottom left position, the body of the first electrode has different widths between each of the ITO slits with unequal length and each of the ITO slits with equal length.

In one embodiment of the present invention, when the body of the second electrode is in the form of the "》" shape, the ITO slits of the second electrode are positioned at a top right position, a bottom right position and a middle left position of the second electrode. The body of the second electrode includes portions extending vertically along a left edge and a right edge of the pixel, and extending horizontally along an upper edge and a lower edge of the pixel with ITO slits formed therein.

In one embodiment of the present invention, when the body of the second electrode is in the form of the "《" shape, the ITO slits with unequal length of the second electrode are positioned at a top left position, a bottom left position and a middle right position of the second electrode. The body of the second electrode includes portions extending vertically along a left edge and a right edge of the pixel, and extending horizontally along an upper edge and a lower edge of the pixel with ITO slits formed therein.

In comparison with the conventional PVA pixel electrode and LCD using the same having a problem that the display quality and aperture ratio of the pixel are affected by the fringe field effects of the liquid crystal molecules, the PVA pixel electrode and the LCD apparatus using the same of the present invention can improve the transmittance and display quality of the pixel by modifying ITO slits at the fringes on the TFT array substrate or the CF substrate.

The structure and the technical means adopted by the present invention to achieve the above and other objects can be best understood by referring to the following detailed description of the preferred embodiments and the accompanying drawings.

DESCRIPTION OF THE DRAWINGS

FIG. 1A is a structural diagram showing a first electrode on a TFT array substrate of a conventional PVA pixel electrode;

FIG. 1B is a structural diagram showing a second electrode on a CF substrate of the conventional PVA pixel electrode;

DETAILED DESCRIPTION OF THE PREFERRED EMBODIMENTS

Figure 2A:
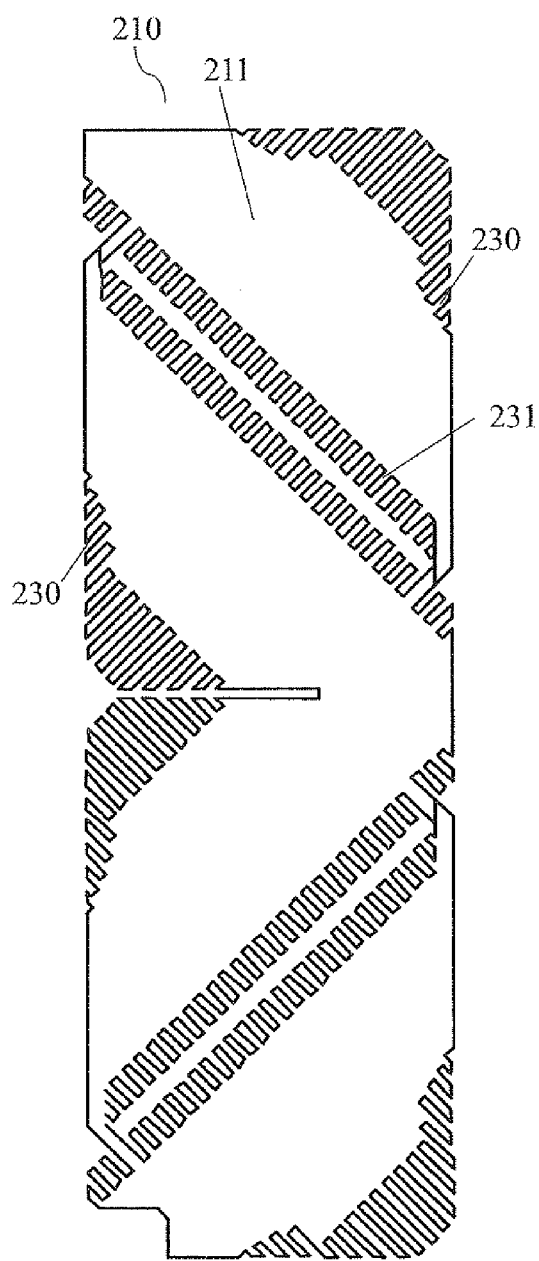
FIG. 2A is a structural diagram showing a first electrode on a TFT array substrate according to a first preferred embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Figure 2B:
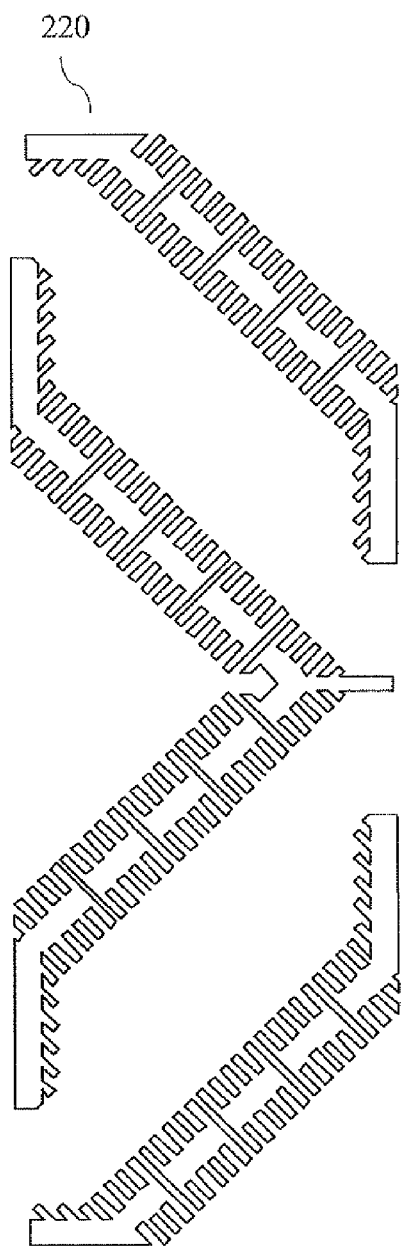
FIG. 2B is a structural diagram showing a second electrode on a CF substrate according to the first preferred embodiment of the present invention.

In a first preferred embodiment of the present invention, referring to FIG. 2A and FIG. 2B, structural diagrams showing a first electrode and a second electrode of a PVA pixel electrode according to the first preferred embodiment of the present invention are illustrated. The PVA pixel electrode comprises the first electrode 210 and the second electrode 220. The first electrode 210 is disposed on a thin film transistor (TFT) array substrate, and the second electrode 220 is disposed on a color filter (CF) substrate. An alignment of liquid crystal molecules between the first electrode 210 and the second electrode 220 is controlled by an electric field applied between the first electrode 210 and the second electrode 220. In this case, the first electrode 210 is in the form of a "》" or "《" shape. The shape of the second electrode 220 corresponds to the shape of the first electrode 210, and the electrode 210, 220 are divided into eight domains, respectively, so as to generate eight liquid crystal domains. Thus, a viewing angle of the LCD can be improved by the eight domains. In the PVA pixel electrode of the present invention, the first electrode 210 includes a body 211 and ITO slits 230 with unequal length extended vertically from the body 211, the ITO slits 230 with unequal length are disposed between the fringes of the first electrode 210 and the second electrode 220 for improving a display quality of the pixel.

Figures 5A, 5B, 5C:
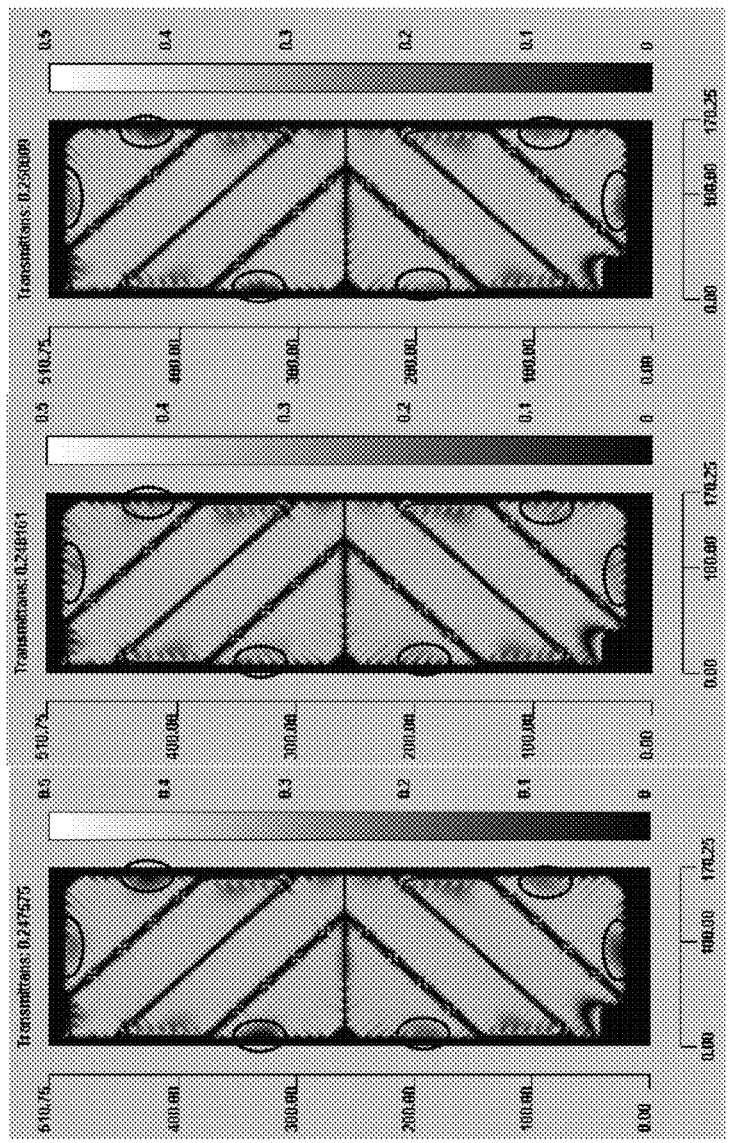
FIG. 5A is an output simulation diagram of the conventional PVA pixel electrode.
FIG. 5B is an output simulation diagram of the PVA pixel electrode according to the first preferred embodiment of the present invention.
FIG. 5C is an output simulation diagram of the PVA pixel electrode according to the second preferred embodiment of the present invention.

In this embodiment, only the first electrode 210 is modified, and the structure of the second electrode on the CF substrate shown in FIG. 2B is identical to the structure of the second electrode on the CF substrate shown in FIG. 1B. The structure of the first electrode on the TFT array substrate shown in FIG. 2A is modified correspondingly. Referring to FIG. 2A again, the structures of the first electrode at the six marked positions shown in FIG. 5A are modified, so as to arrange the ITO slits 230 with unequal length between the fringes of the first electrode 210 and the second electrode 220. In this case, a length difference between the adjacent ITO slits 230 of the first electrode 210 is in the range of 1 um to 10 um. The ITO slits 230 are formed at the fringe of the first electrode 210 for mitigating the fringe field effects. The ITO slits 230 at the fringe extend with unequal length for varying a distribution of the fringe field, so as to allow the orientations of the liquid crystal molecules are the same at the fringes and the inner, thereby mitigating an undesired effect of the disclination line, as shown in FIG. 5B. In comparison with the marked positions in FIG. 5A and FIG. 5B, the dark lines are mitigated, and an increase of 0.23% of the transmittance thereof is obtained.

When the body 211 of the first electrode 210 is in the form of the "》" shape, the corresponding fringes of the first electrode 210 and the second electrode 220 where the fringe field effects easily arise are positioned at a top right position, a bottom right position and a middle left position of the first electrode 210. Therefore, the ITO slits with unequal length 230 of the first electrode 210 are formed at the top right position, the bottom right position and the middle left position of the first electrode 210. The first electrode 210 further comprises ITO slits with equal length 231 positioned horizontally between the ITO slits with unequal length 230 at the middle left position and the top right position and positioned horizontally between the ITO slits with unequal length 230 at the middle left position and the bottom right position, the body have different widths between each of the ITO slits with unequal length 230 and each of the ITO slits with equal length 231. When the body 211 of the first electrode 210 is in the form of the "《" shape, the corresponding fringes of the first electrode 210 and the second electrode 220 where the fringe field effects easily arise are positioned at a top left position, a bottom left position and a middle right position of the first electrode 210. Therefore, the ITO slits with unequal length 230 of the first electrode 210 are formed at the top left position, the bottom left position and the middle right position of the first electrode 210.

Figure 3A:
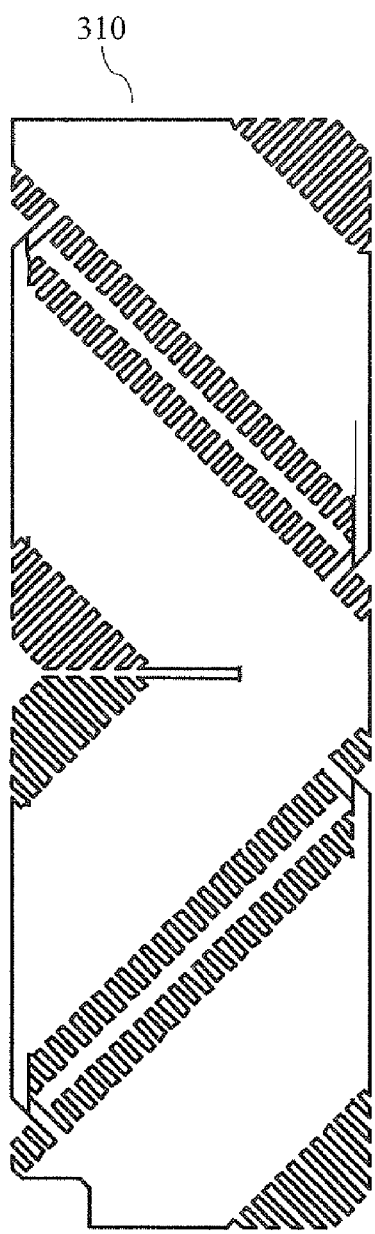
FIG. 3A is a structural diagram showing a first electrode on a TFT array substrate according to a second preferred embodiment of the present invention.
Figure 3B:
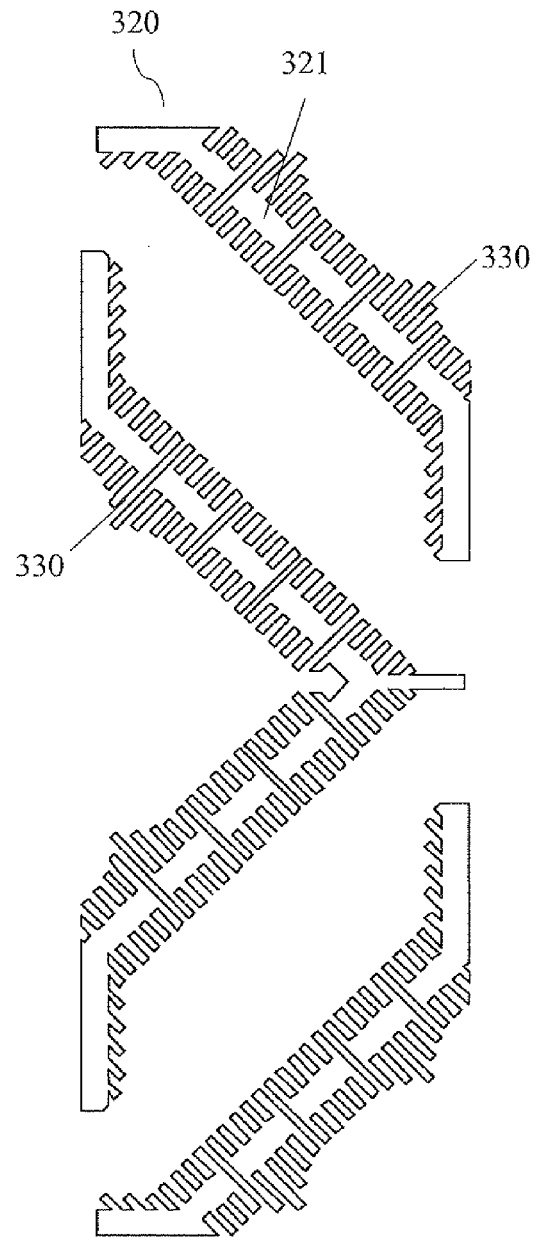
FIG. 3B is a structural diagram showing a second electrode on a CF substrate according to the second preferred embodiment of the present invention.

In a second preferred embodiment of the present invention, referring to FIG. 3A and FIG. 3B, structural diagrams showing a first electrode and a second electrode of the PVA pixel electrode according to the second preferred embodiment of the present invention are illustrated. The PVA pixel electrode comprises the first electrode 310 and the second electrode 320. The first electrode 310 is disposed on the TFT array substrate, and the second electrode 320 is disposed on the CF substrate. An alignment of liquid crystal molecules between the first electrode 310 and the second electrode 320 is controlled by an electric field applied between the first electrode 310 and the second electrode 320. In this case, the first electrode 310 is in the form of a "》" or "《" shape. The shape of the second electrode 320 corresponds to the shape of the first electrode 310, and the electrode 310, 320 are divided into eight domains, respectively, so as to generate eight liquid crystal domains. Thus, a viewing angle of the LCD can be improved by the eight domains. In the PVA pixel electrode of the present invention, the second electrode 320 includes a body 321 and ITO slits 330 with unequal length which extended vertically from the body 321, the ITO slits 330 with unequal length are disposed between the fringes of the first electrode 310 and the second electrode 320 for improving the display quality of the pixel.

In this embodiment, only the second electrode 320 is modified, and the structure of the first electrode 310 on the TFT array substrate shown in FIG. 3A is identical to the structure of the second electrode on the TFT array substrate shown in FIG. 1A. The structure of the second electrode 320 on the CF substrate shown in FIG. 3B is modified correspondingly. Referring to FIG. 3B again, the structures of the second electrode 320 at the six marked positions shown in FIG. 5A are modified, so as to arrange the ITO slits 330 with unequal length between the fringes of the first electrode 310 and the second electrode 320. In this case, a length difference between the adjacent ITO slits 330 of the second electrode 320 is in the range of 1 um to 15 um. The ITO slits 330 are formed at the fringes of the second electrode 320 for mitigating the fringe field effects. The ITO slits 330 at the fringes extend with unequal length for varying a distribution of the fringe field, so as to allow the orientations of the liquid crystal molecules are the same at the fringe and the inner, thereby mitigating an undesired effect of the disclination line, as shown in FIG. 5C. In comparison with the marked positions in FIG. 5A and FIG. 5C, the dark lines are mitigated, and an increase of 0.98% of the transmittance thereof is obtained.

When the body 321 of the second electrode 320 is in the form of the "》" shape, the corresponding fringes of the first electrode 310 and the second electrode 320 where the fringe field effects easily arise are positioned at a top right position, a bottom right position and a middle left position of the second electrode 320. Therefore, the ITO slits with unequal length 330 of the second electrode 320 are formed at the top right position, the bottom right position and the middle left position of the second electrode 320; the body 321 of the second electrode 320 includes portions extending vertically along a left edge and a right edge of the pixel, and extending horizontally along an upper edge and a lower edge of the pixel with ITO slits formed therein. When the body 321 of the second electrode 320 is in the form of the "《" shape, the corresponding fringes of the first electrode 310 and the second electrode 320 where the fringe field effects easily arise are positioned at a top left position, a bottom left position and a middle right position of the second electrode 320. Therefore, the ITO slits with unequal length 330 of the second electrode 320 are formed at the top left position, the bottom left position and the middle right position of the second electrode 320.

Figures 4A, 4B:
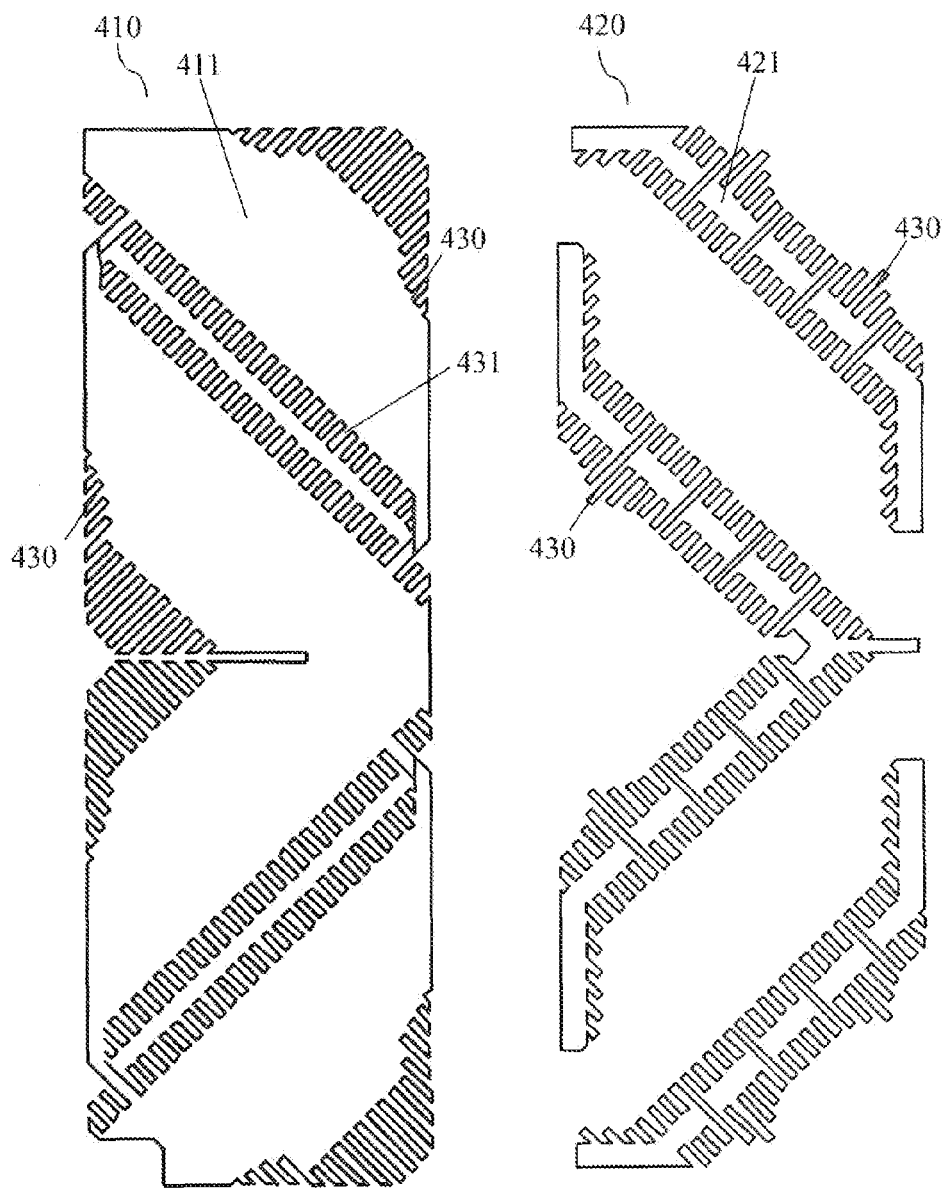
FIG. 4A is a structural diagram showing a first electrode on a TFT array substrate according to a third preferred embodiment of the present invention.
FIG. 4B is a structural diagram showing a second electrode on a CF substrate according to the third preferred embodiment of the present invention.

In a third preferred embodiment of the present invention, referring to FIG. 4A and FIG. 4B, structural diagrams showing a first electrode and a second electrode of a PVA pixel electrode according to the third preferred embodiment of the present invention are illustrated. The PVA pixel electrode comprises the first electrode 410 and the second electrode 420. The first electrode 410 is disposed on the TFT array substrate, and the second electrode 420 is disposed on the CF substrate. An alignment of liquid crystal molecules between the first electrode 410 and the second electrode 420 is controlled by an electric field applied between the first electrode 410 and the second electrode 420. In this case, the first electrode 410 is in the form of a "》" or "《" shape. The shape of the second electrode 420 corresponds to the shape of the first electrode 410, and the electrode 410, 420 are divided into eight domains, respectively, so as to generate eight liquid crystal domains. Thus, a viewing angle of the LCD can be improved by the eight domains. In the PVA pixel electrode of the present invention, the first electrode 410 and the second electrode 420 include a body 411, 421 and ITO slits 430 with unequal length extended vertically from the body 411, the ITO slits 430 with unequal length are disposed between the fringes of the first electrode 410 and the second electrode 420 for improving the display quality of the pixel.

In this embodiment, the first electrode 410 and the second electrode 420 are modified, and the structure of the first electrode 410 on the TFT array substrate shown in FIG. 4A is modified, and the second electrode 420 on the CF substrate shown in FIG. 4B is also modified. Referring to FIG. 4A and FIG. 4B again, the structures of the first electrode 410 and the second electrode 420 at the six marked positions shown in FIG. 5A are modified, so as to arrange the ITO slits 430 with unequal length between the fringes of the first electrode 410 and the second electrode 420. In this case, a length difference between the adjacent ITO slits 430 of the first electrode 410 is in the range of 1 um to 10 um, and a length difference between the adjacent ITO slits 430 of the second electrode 420 is in the range of 1 um to 15 um. The ITO slits 430 are formed at the fringes of the first electrode 410 and the second electrode 420 for mitigating the fringe field effects. The ITO slits 430 at the fringes extend with unequal length for varying a distribution of the fringe field, so as to allow the orientations of the liquid crystal molecules are the same at the fringe and the inner, thereby mitigating an undesired effect of the disclination line.

When the body 411 of the first electrode 410 and the body second 421 of the second electrode 420 are in the form of the "》" shape, the corresponding fringes of the first electrode 410 and the second electrode 420 where the fringe field effects easily arise are positioned at a top right position, a bottom right position and a middle left position of the first electrode 410 and the second electrode 420. Therefore, the ITO slits with unequal length 430 of the first electrode 410 and the second electrode 420 are formed at the top right position, the bottom right position and the middle left position of the electrodes. The first electrode 410 further comprises ITO slits with equal length 431 positioned horizontally between the ITO slits with unequal length 430 at the middle left positioned and the top right position and positioned horizontally between the ITO slits with unequal length 430 at the middle left position and the bottom right position, the body have different widths between each of the ITO slits with unequal length 430 and each of the ITO slits with equal length 431; the body 421 of the second electrode 420 includes portitons extending vertically along a left edge and a right edge of the pixel, and extending horizontally along an upper edge and a lower edge of the pixel with ITO formed therein. When the body of the first electrode 410 and the body of the second electrode 420 are in the form of the "《" shape, the corresponding fringes of the first electrode 410 and the second electrode 420 where the fringe field effects easily arise are positioned at a top left position, a bottom left position and a middle right position of the first electrode 410 and the second electrode 420. Therefore, the ITO slits with equal length 430 of the first electrode 410 and the second electrode 420 are formed at the top left position, the bottom left position and the middle right position of the electrodes.

The present invention further provides an LCD apparatus comprising a LC layer, a TFT array substrate, a CF substrate and PVA pixel electrodes. The TFT array substrate is configured to control the orientations of the liquid crystal molecules. The CF substrate is configured to display different colors. Each of the PVA pixel electrodes comprises the first electrode with a body in the form of a "》" or "《" shape disposed on the TFT array substrate, and the second electrode in the form of a "》" or "《" shape corresponding to the first electrode and disposed on the CF substrate. An alignment of liquid crystal molecules between the first electrode and the second electrode is controlled by an electric field between the first electrode and the second electrode. The first electrode and/or the second electrode includes ITO slits with unequal length extended vertically from the body, the ITO slits with unequal length are disposed between the fringes of the first electrode and the second electrode for improving a display quality of the pixel. The length difference between adjacent ITO slits of the first electrode is in the range of 1 um to 10 um, and the length difference between adjacent ITO slits of the second electrode is in the range of 1 um to 15 um. When the body of the first electrode is in the form of the "》" shape, the ITO slits with unequal length of the first electrode are positioned at a top right position, a bottom right position and a middle left position of the first electrode; the first electrode further comprises ITO slits with equal length positioned horizontally between the ITO slits with unequal length at the middle left position and the top right position and positioned horizontally between the ITO slits with unequal length at the middle left position and the bottom right position, the body have different widths between each of the ITO slits with unequal length and each of the ITO slits with equal length. When the body of the first electrode is in the form of the "《" shape, the ITO slits with unequal length of the first electrode are positioned at a top left position, a bottom left position and a middle right position of the first electrode. When the body of the second electrode is in the form of the "》" shape, the ITO slits with unequal length of the second electrode are positioned at a top right position, a bottom right position and a middle left position of the second electrode; the body of the second electrode includes portions extending vertically along a left edge and a right edge of the pixel, and extending horizontally along an upper edge and a lower edge of the pixel with ITO slits formed therein. When the body of the second electrode is in the form of the "《" shape, the ITO slits with unequal length of the second electrode are positioned at a top left position, a bottom left position and a middle right position of the second electrode. The beneficial effect and the embodiments of the LCD apparatus of the present invention are the same or similar to the embodiments of the above-mentioned PVA pixel electrode. Please refer to the description of the embodiments of the above-mentioned PVA pixel electrode.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A patterned vertical alignment (PVA) pixel electrode comprising:
   a first electrode in the form of a "》" or "《" shape disposed on a thin film transistor (TFT) array substrate; and
   a second electrode in the form of a "》" or "《" shape corresponding to the first electrode and disposed on a color filter (CF) substrate, wherein an alignment of liquid crystal molecules between the first electrode and the second electrode is controlled by an electric field between the first electrode and the second electrode, characterized in that: the first electrode and the second electrode include ITO slits with unequal length extended vertically from the body, the ITO slits with unequal length are disposed between fringes of the first electrode and the second electrode for improving a display quality of the pixel; and a length difference between adjacent ITO slits of the first electrode is in the range of 1 um to 10 um, and a length difference between the adjacent ITO slits of the second electrode is in the range of 1 um to 15 um;
   when the body of the first electrode and the body of the second electrode are in the form of the "》" shape, the ITO slits with unequal length of the first electrode and the second electrode are positioned at a top right position, a bottom right position and a middle left position of the electrodes;
   the first electrode further comprises ITO slits with equal length positioned horizontally between the ITO slits with unequal length at the middle left position and the top right position and positioned horizontally between the ITO slits with unequal length at the middle left position and the bottom right position, the body of the first electrode having different widths between each of the ITO slits with unequal length and each of the ITO slits with equal length; and
   the body of the second includes portions extending vertically along a left edge and a right edge of the pixel, and extending horizontally along an upper edge and a lower edge of the pixel with ITO slits formed therein; and
   when the body of the first electrode and the body of the second electrode are in the form of the "《" shape, the ITO slits with unequal length of the first electrode and the second electrode are positioned at a top left position, a bottom left position, and a middle right position of the electrodes;

the first electrode further comprises ITO slits with equal length positioned horizontally between the ITO slits with unequal length at the middle right position and the top left position and positioned horizontally between the ITO slits with unequal length at the middle right position and the bottom left position, the body of the first electrode having different widths between each of the ITO slits with unequal length and each of the ITO slits with equal length; and the body of the second electrode includes portions extending vertically along a left edge and a right edge of the pixel, and extending horizontally along an upper edge and a lower edge of the pixel with ITO slits formed therein.

2. A PVA pixel electrode comprising:

a first electrode in the form of a "》" or "《" shape disposed on a TFT array substrate; and a second electrode in the form of a "》" or "《" shape corresponding to the first electrode and disposed on a CF substrate, wherein an alignment of liquid crystal molecules between the first electrode and the second electrode is controlled by an electric field between the first electrode and the second electrode, characterized in that: the first electrode and the second electrode includes ITO slits with unequal length extended vertically from the body, the ITO slits with unequal length are disposed between fringes of the first electrode and the second electrode for improving a display quality of the pixel, and a length difference between adjacent ITO slits of the first electrode is in the range of 1 um to 10 um; and when the body of the first electrode is in the form of the "》" shape, the ITO slits with unequal length of the first electrode are positioned at a top right position, a bottom right position and a middle left position of the first electrode;

the first electrode further comprises ITO slits with equal length positioned horizontally between the ITO slits with unequal length at the middle left position and the top right position and positioned horizontally between the ITO slits with unequal length at the middle left position and the bottom right position, the body of the first electrode having different widths between each of the ITO slits with unequal length and each of the ITO slits with equal length; and when the body of the first electrode is in the form of the "《" shape, the ITO slits with unequal length of the first electrode are positioned at a top left position, a bottom left position, and a middle right position of the first electrode; and the first electrode further comprises ITO slits with equal length positioned horizontally between the ITO slits with unequal length at the middle right position and the top left position and positioned horizontally between the ITO slits with unequal length at the middle right position and the bottom left position, the body of the first electrode having different widths between each of the ITO slits with unequal length and each of the ITO slits with equal length.

3. A PVA pixel electrode comprising:

a first electrode with a body in the form of a "》" or "《" shape disposed on a TFT array substrate; and a second electrode with a body in the form of a "》" or "《" shape corresponding to the first electrode and disposed on a CF substrate, wherein an alignment of liquid crystal molecules between the first electrode and the second electrode is controlled by an electric field between the first electrode and the second electrode, characterized in that: the first electrode and the second electrode include ITO slits with unequal length extended vertically from the body, the ITO slits with unequal length are disposed between fringes of the first electrode and the second electrode for improving a display quality of the pixel, and a length difference between adjacent ITO slits of the second electrode is in the range of 1 um to 15 um;

when the body of the second electrode is in the form of the "》" shape, the ITO slits with unequal length of the second electrode are positioned at a top right position, a bottom right position and a middle left position of the second electrode, the body of the second electrode includes portions extending vertically along a left edge and a right edge of the pixel, and extending horizontally along an upper edge and a lower edge of the pixel with ITO slits formed therein;

when the body of the first electrode is in the form of the "》" shape, the ITO slits with unequal length of the first electrode are positioned at a top right position, a bottom right position and a middle left position of the first electrode;

the first electrode further comprises ITO slits with equal length positioned horizontally between the ITO slits with unequal length at the middle left position and the top right position and positioned horizontally between the ITO slits with unequal length at the middle left position and the bottom right position, the body of the first electrode having different widths between each of the ITO slits with unequal length and each of the ITO slits with equal length;

when the body of the first electrode is in the form of the "《" shape, the ITO slits with unequal length of the first electrode are positioned at a top left position, a bottom left position, and a middle right position of the first electrode;

the first electrode further comprises ITO slits with equal length positioned horizontally between the ITO slits with unequal length at the middle right position and the top and positioned horizontally between the ITO slits with unequal length at the middle right position and the bottom left position, the body of the first electrode having different widths between each of the ITO slits with unequal length and each of the ITO slits with equal length; and when the body of the second electrode is in the form of the "《" shape, the ITO slits with unequal length of the second electrode are positioned at a top left position, a bottom left position, and a middle right position of the second electrode, the body of the second electrode includes portions extending vertically along a left edge and a right edge of the pixel, and extending horizontally along an upper edge and a lower edge of the pixel with ITO slits formed therein.

4. A liquid crystal display apparatus, characterized in that:

the liquid crystal display apparatus comprises:

a liquid crystal layer;

a TFT array substrate configured to control orientations of liquid crystal molecules of the liquid crystal layer;

a CF substrate configured to display different colors; and a plurality of PVA pixel electrodes, wherein each of the PVA pixel electrodes comprising:

a first electrode with a body in the form of a ">" or "《" shape disposed on the TFT array substrate; and a second electrode with a body in the form of a "》" or "《" shape corresponding to the first electrode and disposed on the CF substrate, wherein an alignment of liquid crystal molecules between the first electrode and the second electrode is controlled by an electric field between the first electrode and the second electrode, characterized in that: the first electrode and the second electrode include ITO slits with unequal length extended vertically from the body, the ITO slits with unequal length are disposed between fringes of the first electrode and the second electrode for improving a display quality of the pixel, and a length difference between adjacent ITO slits of the first electrode is in the range of 1 um to 10 um;

when the body of the first electrode and the body of the second electrode are in the form of the "》" shape, the ITO slits with unequal length of the first electrode and the second electrode are positioned at a top right position, a bottom right position and a middle left position of the first electrode;

the first electrode further comprises ITO slits with equal length positioned horizontally between the ITO slits with unequal length at the middle left position and the top right position and positioned horizontally between the ITO slits with unequal length at the middle left position and the bottom right position, the body of the first electrode having different widths between each of the ITO slits with unequal length and each of the ITO slits with equal length; and the body of the second electrode includes portions extending vertically along a left edge and a right edge of the pixel, and extending horizontally along an upper edge and a lower edge of the pixel with ITO slits formed therein; and when the body of the first electrode and the body of the second electrode are in the form of the "《" shape, the ITO slits with unequal length of the first electrode and the second electrode are positioned at a top left position, a bottom left position, and a middle right position of the electrodes;

the first electrode further comprises ITO slits with equal length positioned horizontally between the ITO slits with unequal length at the middle right position and the top left position and positioned horizontally between the ITO slits with unequal length at the middle right position and the bottom left position, the body of the first electrode having different widths between each of the ITO slits with unequal length and each of the ITO slits with equal length; and the body of the second electrode includes portions extending vertically along a left edge and a right edge of the pixel, and extending horizontally along an upper edge and a lower edge of the pixel with ITO slits formed therein.

5. The liquid crystal display apparatus according to claim 4, wherein a length difference between adjacent ITO slits of the second electrode is in the range of 1 um to 15 um.

* * * * *